US011808665B2

(12) United States Patent
Regef et al.

(10) Patent No.: US 11,808,665 B2
(45) Date of Patent: Nov. 7, 2023

(54) LEAK DETECTION DEVICE

(71) Applicant: ATEQ, Les Clayes sous Bois (FR)

(72) Inventors: Jean Luc Regef, Taipei (TW); Davy Le Boucher, Bloomfield Hills, MI (US)

(73) Assignee: ATEQ, Les Clayes sous Bois (FR)

( * ) Notice: Subject to any disclaimer, the term of this patent is extended or adjusted under 35 U.S.C. 154(b) by 0 days.

(21) Appl. No.: 18/077,725

(22) Filed: Dec. 8, 2022

(65) Prior Publication Data

US 2023/0112995 A1 Apr. 13, 2023

Related U.S. Application Data

(63) Continuation of application No. 17/159,740, filed on Jan. 27, 2021, now Pat. No. 11,543,324.

(30) Foreign Application Priority Data

Jan. 28, 2020 (FR) ........................................ 2000800

(51) Int. Cl.
*G01M 3/32* (2006.01)
(52) U.S. Cl.
CPC ................................. *G01M 3/3263* (2013.01)
(58) Field of Classification Search
CPC ...... G01M 3/00; G01M 3/002; G01M 3/3209; G01M 3/3263; G01M 3/3281; G01M 3/3236; G01M 3/3272; G01M 3/34; G01M 3/007
See application file for complete search history.

(56) References Cited

U.S. PATENT DOCUMENTS

| 3,355,932 A | 12/1967 | Mulligan |
| 4,686,851 A | 8/1987 | Holm et al. |
| 4,839,581 A | 6/1989 | Peterson, Jr. |
| 4,954,087 A | 9/1990 | Lauks et al. |
| 5,111,137 A | 5/1992 | Heumann et al. |
| 5,206,097 A | 4/1993 | Burns et al. |
| 5,546,789 A | 8/1996 | Balke et al. |
| 5,795,995 A | 8/1998 | Shimaoka et al. |
| 6,033,233 A | 3/2000 | Haseyama et al. |
| 6,082,184 A | 7/2000 | Lehmann |

(Continued)

FOREIGN PATENT DOCUMENTS

| DE | 69623171 T2 | 4/2003 |
| DE | 10 2012 214738 A1 | 2/2014 |

(Continued)

OTHER PUBLICATIONS

Dipak K. Sarkar, Properties of thermal insulation materials, 2015 (Year: 2015).*

(Continued)

*Primary Examiner* — John Fitzgerald
*Assistant Examiner* — Truong D Phan
(74) *Attorney, Agent, or Firm* — Young Basile Hanlon & MacFarlane, P.C.

(57) ABSTRACT

A leak detection device operable to measure fluid leaks in an element to be tested that is positioned in a first enclosure. In one example, a measuring module is positioned in a second enclosure and connected to the first enclosure and the element to be tested by an aeraulic connection. At least one of the first enclosure and the measuring module are thermally insulated using an insulating material.

17 Claims, 2 Drawing Sheets

(56) References Cited

U.S. PATENT DOCUMENTS

| | | |
|---|---|---|
| 6,272,902 B1 | 8/2001 | Chen et al. |
| 7,131,316 B2 | 11/2006 | Doehla et al. |
| 11,187,752 B2 | 11/2021 | Regef et al. |
| 11,543,324 B2 * | 1/2023 | Regef ................ G01M 3/3281 |
| 2002/0008534 A1 | 1/2002 | Yamazaki |
| 2005/0151456 A1 | 7/2005 | Yoon et al. |
| 2008/0018355 A1 | 1/2008 | Takekoshi et al. |
| 2009/0095095 A1 | 4/2009 | Hayashi et al. |
| 2009/0164148 A1 | 6/2009 | Shinoda |
| 2014/0239962 A1 | 8/2014 | Oda et al. |
| 2018/0026313 A1 | 1/2018 | Fukuoka et al. |
| 2018/0328810 A1 | 11/2018 | Wetzig |
| 2018/0328812 A1 | 11/2018 | Fukushima et al. |
| 2020/0370744 A1 | 11/2020 | Rama et al. |

FOREIGN PATENT DOCUMENTS

| | | | |
|---|---|---|---|
| DE | 102012216868 A1 * | 3/2014 | ............. G01M 3/26 |
| DE | 102012216868 A1 | 3/2014 | |
| DE | 10 2014 205918 A1 | 10/2015 | |
| EP | 2672246 A1 | 12/2013 | |
| FR | 3005642 A1 | 11/2014 | |
| SU | 826976 A3 * | 4/1981 | |
| SU | 1237923 A1 | 6/1986 | |
| WO | 2011132391 A1 | 10/2011 | |
| WO | 2019/053121 A1 | 3/2019 | |

OTHER PUBLICATIONS

Engineering Dictionary, https://www.engineering-dictionary.com/index.php?definition=5445 Accessed May 26, 2022.

* cited by examiner

LEAK DETECTION DEVICE

CROSS-REFERENCE TO RELATED APPLICATIONS

This continuation application claims priority benefit to U.S. application Ser. No. 17/159,740 filed Jan. 27, 2021, which claims priority benefit to French Patent Application number FR20000800 filed Jan. 28, 2020, the entire contents of both applications are incorporated herein by reference.

TECHNICAL FIELD

The present invention relates to the field of devices for detecting leaks (or for measuring tightness) on parts to be tested, more particularly leak detection devices based on the measurement of a physical quantity, such as a pressure or a flow rate, relative to a leak level.

BACKGROUND

Indeed, it is necessary to be able to check the integrity of parts and/or to check whether the latter have a leak and to be able to quantify it. The products/parts to be tested are for example electronic appliances, mechanical parts, containers, etc., tightness being a critical characteristic in the context of products subject to external stress and/or required to meet particular operating requirements, such as that of being impermeable to liquids (such as water) or of not having leaks liable to degrade the performances of the product, etc.

Furthermore, the method "by pressure variation" (or variation of a related physical quantity, such as the flow rate) is the quickest and most economical method. Indeed, in the pressure variation method, the object to be tested is subjected to a controlled pressure variation, i.e. a pressure variation is applied to an internal volume of the object (so-called direct method) or to a closed volume surrounding the object to be tested (so-called indirect method). Then, after a defined time, the pressure is measured again, if the object has a leak, then the pressure measured is different from the initial pressure.

The pressure variation measured by the pressure sensor of the device thus makes it possible to check the tightness of an object and quantify a leak if the object is not impermeable.

It is thus critical to have a pressure (or flow rate) sensor capable of measuring small pressure (or flow rate) variations and thus detect small leaks.

Nevertheless, the measurements made with this type of device can be influenced by environmental factors or intrinsic factors to said device. These factors are all the more impacting when it is sought to determine low leak levels on objects having large volumes, such as electric, particularly motor vehicle, batteries. Indeed, in the case of large volumes and low leak levels, the variations related to the temperature of the environment or of the element to be tested can give rise to pressure variations of an order of magnitude substantially equal to the level of the leaks that it is sought to detect.

SUMMARY

Thus, research and tests were carried out by the holder to propose a leak detection device having an enhanced sensitivity and enabling superior repeatability in leak detection, while enhancing the level of detectability of said leaks.

The invention is thus a novel leak detection device comprising:

at least one enclosure capable of receiving an element to be tested;
a module for measuring at least one physical quantity relative to a leak level;
at least one aeraulic connection connecting said at least one enclosure to said measuring module;
Characterised in that said at least one enclosure and/or said module are thermally insulated.

Thermally insulating at least the volume wherein the leak detection is performed and/or the measuring module makes it possible to avoid environmental parameters, such as rapid temperature variations liable to arise in the immediate environment of said detection device, and makes it possible to enhance the level of sensitivity of the measuring module (therefore the level of detectability of the leaks). Indeed, as the leak detection is based on a pressure measurement depending particularly on the temperature (therefore on the surrounding thermal noise), enhancing the inertia and thermal decoupling of the volume used as a basis for determining the leak level enhances the quality and the repeatability of a leak detection.

It will be noted that, in the case of a leak detection on an element having a large volume, it is advantageous to thermally insulate the enclosure receiving the element to be tested, otherwise it is advantageous to thermally insulate the measuring module. However, if it is sought to optimise the detection of a leak, it is very advantageous to insulate both the enclosure receiving the element to be tested and the measuring module.

According to a possible feature, the thermal insulation of said enclosure and/or said measuring module is carried out by means of a material having a thermal conductivity less than 0.05 $W \cdot m^{-1} \cdot K^{-1}$ at 20° C., and preferably less than 0.03 $W \cdot m^{-1} \cdot K^{-1}$ at 20° C., and even more preferably less than 0.01 $W \cdot m^{-1} \cdot K^{-1}$ at 20° C.

According to a further possible feature, the device comprises at least two enclosures, a thermally insulated enclosure, or first enclosure, capable of receiving the element to be tested and a further thermally insulated enclosure, or second enclosure, housing the measuring module.

According to a further possible feature, said at least one enclosure capable of receiving an element to be tested also houses the measuring module.

According to a further possible feature, the first enclosure is housed in the second enclosure, the volume between the two enclosures defining an intercalated volume. Generally, an intercalated volume is filled with gas, such as an inert gas or air.

It can be advantageous for questions of size to house one of the enclosures in the other, for example the first enclosure in the second. It will be noted that in this case, the first enclosure is not necessarily thermally insulated, the second enclosure thermally insulating, on its own, the element to be tested and the measuring module from the outside.

According to a further possible feature, the device is at least partially delimited by an outer wall, said enclosure of said measuring module, or second enclosure, being surrounded by said at least one outer wall, the volume between said at least one wall and said enclosure of the module defining an intercalated volume.

It will be noted that the presence of an intercalated volume filled with a gas or air makes it possible to increase the thermal decoupling between the enclosure(s) receiving the part to be tested and/or the measuring module and the external environment.

According to a further possible feature, the device comprises a ventilation device configured to agitate a gas, preferably inert, or air in an intercalated volume (of which at least one of the intercalated volumes mentioned above).

Said ventilation device particularly makes it possible to prevent the creation of hot spots and/or thermal bridges between the enclosure(s) and outside the detection device.

According to a further possible feature, the ventilation device is disposed in an intercalated volume (more particularly at least one of the intercalated volumes mentioned above).

Despite the fact that the ventilation device produces heat, this arrangement of said ventilation device, surprisingly, does not degrade the thermal insulation of the enclosure(s) and makes it possible to optimise the size of the leak detection device.

According to a further possible feature, at least one enclosure comprises a double wall configured so that the volume between said two walls is depressurized.

This structure of the enclosure makes it possible to thermally insulate the inside of the enclosure from the outside, indeed, the thermal conductivity of the gas (or air) between the two walls decreases with the pressure thereof. The device according to the invention can thus comprise a vacuum pump configured to decrease the pressure of said gas (or of the air) until the thermal conductivity of said gas (or of the air) is less than 0.05 $W \cdot m^{-1} \cdot K^{-1}$ at 20° C., and preferably less than 0.03 $W \cdot m^{-1} \cdot K^{-1}$ at 20° C., and even more advantageously less than 0.01 $W \cdot m^{-1} \cdot K^{-1}$ at 20° C.

According to a further possible feature, the measuring module comprises at least one pressure sensor.

It will be noted that the measuring module can also comprise one or more valves, one or more electronic circuits, for example for the monitoring and management of valves, measurement, etc.

According to a further possible feature, said sensor is a differential pressure sensor.

According to a further possible feature, said enclosure receiving the element to be tested comprises one or more cavities capable of receiving an element to be tested and a reference element.

It will be noted that if the leak detection is carried out by the direct method, a single cavity capable of receiving the test and reference elements is sufficient. Whereas if the leak detection is carried out with the indirect method, it is necessary to have two separate cavities in said enclosure, each of the cavities respectively receiving an element to be tested and a reference element. In the case where there are two cavities in said enclosure, it is advantageous that the cavities are thermally insulated from one another.

According to a further possible feature, said aeraulic connection comprises at least two conduits connecting said cavities or said elements disposed in said at least one enclosure to the differential pressure sensor, said conduits being substantially symmetrical.

Indeed, in the case where leak detection is carried out by comparing between an element to be tested and a reference element, it is preferable to limit the influence of parameters capable of modifying the measurement, such as a difference in length, diameter, etc. between said conduits of the aeraulic connection.

According to a further possible feature, said at least one aeraulic connection is thermally insulated.

It is advantageous to limit the influence of the temperature of the external environment on the air circulating in the aeraulic connections, this is all the more relevant as the aeraulic connection is long.

According to a further possible feature, said at least one aeraulic connection comprises a thermally insulating sheath, said sheath comprising a material wherein the thermal conductivity is less than 0.05 $W \cdot m^{-1} \cdot K^{-1}$ at 20° C., preferably less than 0.03 $W \cdot m^{-1} \cdot K^{-1}$ at 20° C., and even more advantageously less than 0.01 $W \cdot m^{-1} \cdot K^{-1}$ at 20° C.

According to a further possible feature, said enclosure receiving the element to be tested comprises a single cavity capable of receiving the element to be tested and a reference element.

BRIEF DESCRIPTION OF THE DRAWINGS

The invention will be understood better, and other aims, details, features and advantages thereof will emerge more clearly in the course of the following description of specific embodiments of the invention, given merely by way of illustration and not limitation, with reference to the appended drawings, wherein.

DETAILED DESCRIPTION

Figure 1A:
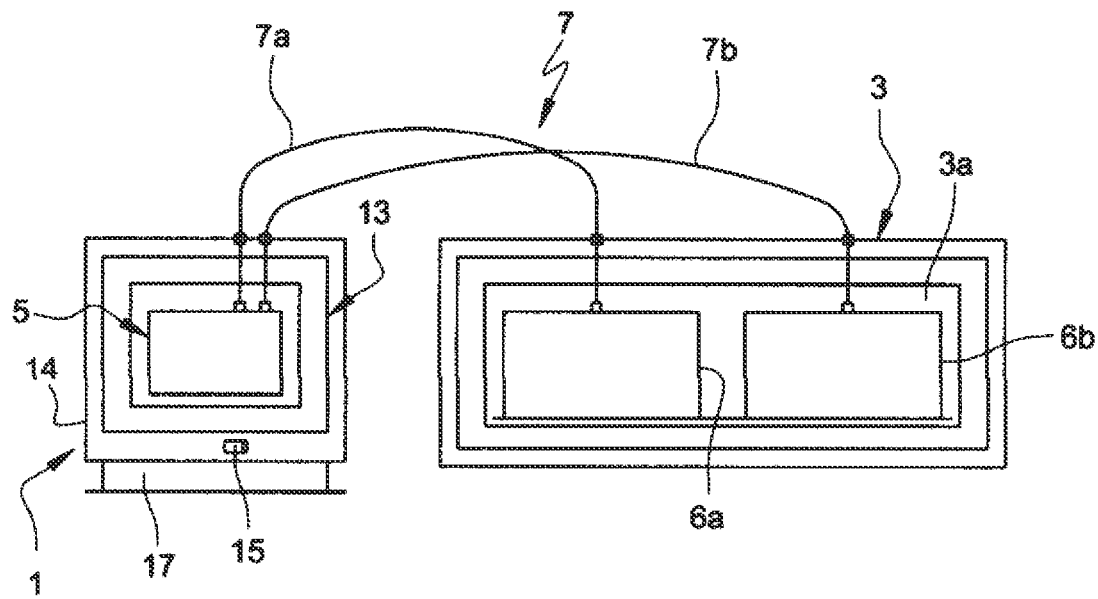
FIG. 1A is a schematic representation of a leak detection device according to a first embodiment of the invention.

FIG. 1A is a schematic representation of a leak detection device 1 according to a first embodiment of the invention.

Said leak detection device 1 thus comprises:
an enclosure 3, or first enclosure, capable of receiving an element to be tested;
a detection or measurement module 5 for measuring at least one physical quantity relative to a leak level, said module 5 comprising at least one pressure sensor (not shown), such as a differential pressure sensor;
at least one aeraulic connection 7 connecting said enclosure 3 to said detection module 5.

Said measuring module 5 can also comprise valves, an electronic control and/or measurement board, a coupling (not shown) with a pressurised air inlet, etc.

Said aeraulic connection 7, by means of said valves and said coupling, enables the detection unit 5 to vary the pressure in the element to be tested (direct method) and connect said pressure sensor to the internal volume of the element to be tested.

In the example shown in FIG. 1A, the pressure variation is applied to an internal volume of the part to be tested, but the detection of a leak could also be performed on a volume surrounding the part to be tested.

In the example shown in FIG. 1A, the enclosure 3 is configured to receive two parts, one element to be tested 6a and one reference element 6b. More particularly, the enclosure 3 thus comprises a single cavity 3a wherein the element to be tested 6a and the reference element 6b are disposed, side by side.

The aeraulic connection 7 comprises, for its part, two conduits 7a and 7b, said conduits 7a and 7b respectively connecting the part to be tested 6a and the reference part 6b to said pressure sensor of the module 5 (but also to the enclosure 3).

The enclosure 3, for its part, is thermally insulated, the term thermally insulated denotes an enclosure having a sufficient thermal insulation and/or inertia such that the leak detection is not impacted by a temperature variation in the environment of said device.

Said leak detection device 1 also comprises a further enclosure 13, or second enclosure. The detection module 5, and more particularly the pressure sensor, is disposed in the enclosure 13 (the other elements of said module, valves, electronics, etc. can be disposed outside said enclosure 13).

The second enclosure 13, similarly to the first enclosure 3, is thermally insulated.

The thermal insulation of the first and/or the second enclosure 3 and 13 is carried out by means of a material having a thermal conductivity less than 0.05 $W \cdot m^{-1} \cdot K^{-1}$ at 20° C., and preferably less than 0.03 $W \cdot m^{-1} \cdot K^{-1}$ at 20° C., and even more advantageously less than 0.01 $W \cdot m^{-1} \cdot K^{-1}$ at 20° C. The enclosures 3 and 13 comprise for example one or more walls made of a material of this type.

Moreover, the device 1 comprises a housing 14 wherein the second enclosure 13 (and therefore the measurement module 5) are disposed, the housing 14 including one or more outer or external walls delimiting a part of the device 1 from the outside. The volume located between the second enclosure 13 and this outer wall defines an intercalated volume wherein a ventilation device 15 is disposed. Said ventilation device 15 is configured to ensure a movement (or agitation) of the air or gas in said intercalated volume.

The leak detection device 1 can also comprise a screen 17 located on the outer wall of the housing 14 and serving to display the results of the leak detection carried out on the element to be tested.

It will be noted, furthermore, that the aeraulic connection 7 is preferably thermally insulated, the conduit(s) 7a, 7b are made of a thermally insulating material or comprise a sheath, mounted on the conduit(s), made of a thermally insulating material. Said material enabling the thermal insulation of said aeraulic connection 7 has a thermal conductivity less than 0.05 $W \cdot m^{-1} \cdot K^{-1}$ at 20° C., and preferably less than 0.03 $W \cdot m^{-1} \cdot K^{-1}$ at 20° C., and more preferably less than 0.01 $W \cdot m^{-1} \cdot K^{-1}$ at 20° C.

Figure 1B:
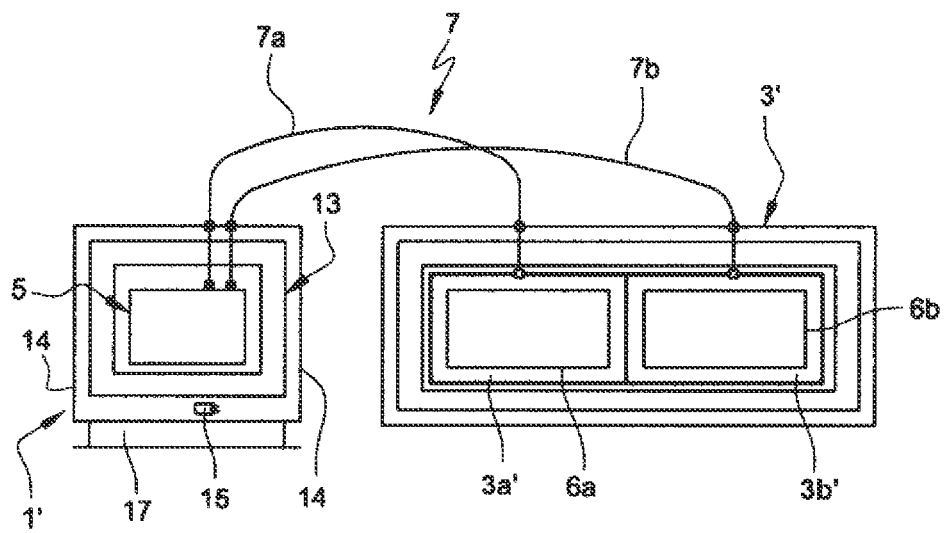
FIG. 1B is a representation of an alternative embodiment of the device in FIG. 1A.

FIG. 1B, for its part, illustrates a leak detection device 1' which is an alternative embodiment of the device 1 shown in FIG. 1A. Identical elements are indicated by means of the same references and will not be described again.

The device 1' comprises an enclosure 3' entirely similar to the enclosure 3 described above, the only difference being that the latter comprises two cavities 3a' and 3b' intended to respectively receive an element to be tested 6a and a reference element 6b.

Indeed, when the leak detection method is carried out indirectly, it is then necessary to have two separate and mutually impermeable cavities 3a' and 3b'. Advantageously, the cavities 3a' and 3b' are also thermally insulated in relation to one another (and also in relation to the outside).

In further alternative embodiments not shown of the devices 1 and 1', only the enclosure receiving the element to be tested or the measuring module is thermally insulated from the outside.

Figure 2:
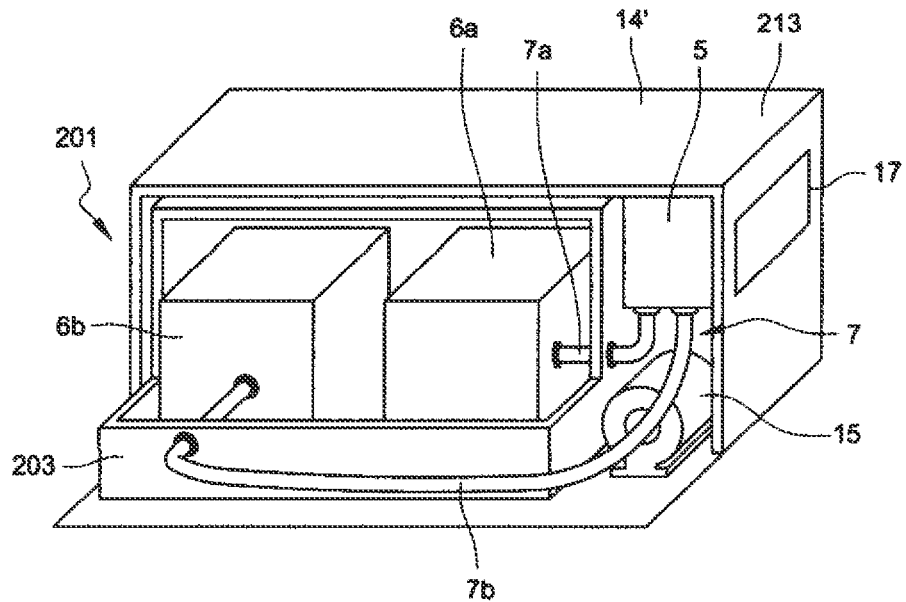
FIG. 2 is a schematic representation, in a perspective, partially cut-away view, of a leak detection device according to a second embodiment of the invention.

FIG. 2 is a schematic representation, in a perspective view, of a leak detection device 201 according to a second embodiment of the invention. The same elements bear the same references as those described above and therefore will not be described again.

The device 201 in FIG. 2 therefore comprises a housing 14' which houses the measuring module 5, an enclosure 203, or first enclosure, configured to receive an element to be tested 6a and a reference element 6b, and an aeraulic connection 7 connecting the measuring module to said elements 6a and 6b.

The first enclosure 203 and/or the housing 14' can be thermally insulated like the enclosures 3 and 13 described above. In the case where the housing 14' is thermally insulated, it then acts as an enclosure 213, or second enclosure (the second enclosure 213 therefore houses/surrounds the first enclosure 203 and the measuring module 5).

It will be noted that the volume defined between the second enclosure 213 and the first enclosure 203 defines an intercalated volume wherein a ventilation device 15 can be disposed.

As above, the device 201 can be provided with a screen 17 for displaying the result of the leak detections carried out on the elements to be tested.

In an alternative embodiment not shown, the first enclosure 203 comprises two separate cavities, preferably thermally insulation in relation to one another (particularly advantageous alternative embodiment for leak detection by the indirect method).

Figure 3:
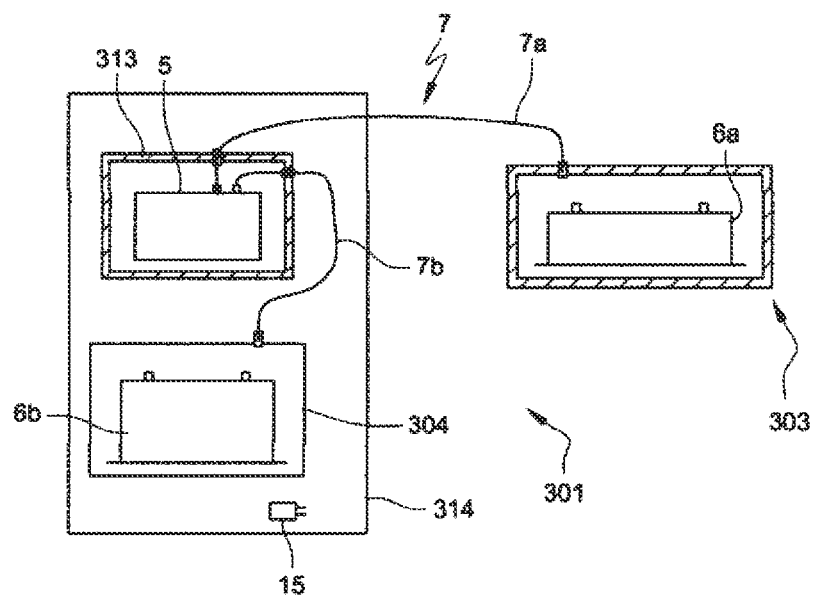
FIG. 3 is a very schematic representation of a leak detection device according to a third embodiment of the invention.

FIG. 3 is a schematic representation of a leak detection device 301 according to a third embodiment of the invention. The same elements bear the same references as those described above and therefore will not be described again.

The device 301 thus comprises a housing 314;

a measuring module 5;

an enclosure 303, or first enclosure, configured to receive an element to be tested 6a;

an enclosure 313, or second enclosure, which is disposed inside housing 314 wherein the measurement module 5 is housed and which is disposed at a distance from the first enclosure 303;

an enclosure 304, or third enclosure, which is disposed in the housing 314 and which is configured to receive a reference element 6b;

an aeraulic connection 7 connecting the measuring module 5 to said enclosures 303 and 304.

As above, the enclosures 303, 304 and/or 313 can be thermally insulated like the enclosure described above (particularly in the first embodiment).

Said device 301 also comprises, as in the other embodiments described, a ventilation device 15 configured to ensure a movement (or agitation) of the air or gas in said intercalated volume.

In alternative embodiments of the first, second and third embodiment not shown, the enclosure(s) housing the measuring module, the element to be tested and/or the reference element, comprise a double wall. Said double wall includes two walls at a distance from one another. More particularly, said double wall of the enclosure is configured such that the volume between said two walls is depressurized, for example by means of a vacuum pump.

That is to say that the device according to the invention comprises for example a vacuum pump configured to reduce the pressure of the gas, such as air or an inert gas, located between the two walls of said enclosure. The pressure of the gas located between the two walls of the enclosure is then lowered until the thermal conductivity of said gas is less than 0.05 $W \cdot m^{-1} \cdot K^{-1}$ at 20° C., and preferably less than 0.03 $W \cdot m^{-1} \cdot K^{-1}$ at 20° C., and more preferably less than 0.01 $W \cdot m^{-1} \cdot K^{-1}$ at 20° C.

What is claimed is:

1. A leak detection device comprising:

a first enclosure defining an internal cavity configured to receive an element to be tested defining an internal volume, the internal cavity is configured to receive a reference element defining an internal volume;

a second enclosure defining an internal volume, wherein the internal cavity of the first enclosure and the internal volume of the second enclosure are selectively sealed from an environment surrounding the respective first enclosure and the second enclosure;

a measuring module positioned in the internal volume of the second enclosure, the measuring module operable to measure a physical quantity of a liquid leak level;

at least one aeraulic connection connecting to said measuring module and in pressure communication with the internal cavity of the first enclosure or the internal volume of the element to be tested and the internal volume of the reference element; and at least one of the first enclosure or the second enclosure including thermal insulation operable to thermally insulate the respective internal cavity of the first enclosure or the internal volume of the second enclosure from the environment surrounding the respective first enclosure or the second enclosure increasing thermal decoupling of the respective internal cavity of the first enclosure or the internal volume of the second enclosure and the respective surrounding environment, the thermal insulation having a thermal conductivity less than 0.05 $W \cdot m^{-1} \cdot K^{-1}$ at 20° C.

2. The device of claim 1, wherein the second enclosure is positioned in outer surrounding relation to the first enclosure to enclose the first enclosure within the internal volume of the second enclosure, the internal volume of the second enclosure defining an intercalated volume between the second enclosure and the first enclosure; the device further comprising a ventilation device positioned within the intercalated volume and operable to circulate a gas positioned in the intercalated volume.

3. The device of claim 1, further comprising:
a housing positioned in outer surrounding relation to the second enclosure.

4. The device of claim 3, wherein the housing defines an intercalated volume between the housing and the second enclosure, the device further comprising a ventilation device in communication with the intercalated volume operable to circulate a gas positioned in the intercalated volume.

5. The device of claim 3, wherein the housing further comprises:
a first wall; and
a second wall spaced from the first wall and defining a volume between the first wall and the second wall, wherein the device further comprises a vacuum pump in communication with the volume between the first wall and the second wall, wherein a further thermal insulation comprises a depressurized volume formed in the volume between the first wall and the second wall by the vacuum pump.

6. A leak detection device comprising:
a first enclosure defining an internal cavity configured to receive an element to be tested, the element to be tested defining an internal volume;
a second enclosure defining an internal volume, wherein the internal cavity of the first enclosure and the internal volume of the second enclosure are selectively sealed from an environment surrounding the respective first enclosure and the second enclosure;
a housing positioned in outer surrounding relation to the second enclosure, the housing defining an intercalated volume between the housing and the second enclosure;

a ventilation device in communication with the intercalated volume operable to circulate a gas positioned in the intercalated volume;

a measuring module positioned in the internal volume of the second enclosure, the measuring module operable to measure a physical quantity of a liquid leak level;

at least one aeraulic connection connecting to said measuring module and in pressure communication with the internal cavity of the first enclosure or the internal volume of the element to be tested; and at least one of the first enclosure or the second enclosure including thermal insulation operable to thermally insulate the respective internal cavity of the first enclosure or the internal volume of the second enclosure from the environment surrounding the respective first enclosure or the second enclosure increasing thermal decoupling of the respective internal cavity of the first enclosure or the internal volume of the second enclosure and the respective surrounding environment, the thermal insulation having a thermal conductivity less than 0.05 $W \cdot m^{-1} \cdot K^{-1}$ at 20° C.

7. The device according to claim 6, wherein the second enclosure is positioned in surrounding relation to the first enclosure enclosing the first enclosure within the second enclosure, the internal cavity of the first enclosure is selectively sealed from the environment defined by the internal volume of the second enclosure surrounding the first enclosure; and the internal volume of the second enclosure is selectively sealed from the environment surrounding the second enclosure.

8. The device according to claim 6, wherein the measuring module comprises at least one pressure sensor.

9. The device of claim 6, wherein at least one of the first enclosure or the second enclosure further comprising a wall at least partially defining the respective internal cavity of the first enclosure or the internal volume of the second enclosure.

10. The device of claim 9, wherein the thermal insulation comprises a material, and wherein the wall is made from the thermal insulation material.

11. The device of claim 10, wherein the thermal insulation material having thermal conductivity less than 0.03 $W \cdot m^{-1} \cdot K^{-1}$ at 20° C.

12. The device of claim 10, wherein the thermal insulation material having thermal conductivity less than 0.01 $W \cdot m^{-1} \cdot K^{-1}$ at 20° C.

13. The device of claim 9, wherein the thermal insulation comprises a material, and wherein the thermal insulation material is connected to the wall.

14. The device of claim 9, wherein the wall further comprises:
a first wall; and
a second wall spaced from the first wall and defining a volume between the first wall and the second wall, wherein the device further comprises a vacuum pump in communication with the volume between the first wall and the second wall, wherein the thermal insulation comprises a depressurized volume formed in the volume between the first wall and the second wall by the vacuum pump.

15. The device of claim 6, wherein the first enclosure includes the thermal insulation operable to thermally insulate the internal cavity of the first enclosure increasing the thermal decoupling of the internal cavity of the first enclosure from the environment surrounding the first enclosure.

16. The device of claim 6, wherein the first enclosure includes the thermal insulation operable to thermally insulate the internal cavity of the first enclosure from the environment surrounding the first enclosure and the second enclosure includes the thermal insulation operable to thermally insulate the internal volume of the second enclosure from the environment surrounding the second enclosure, the respective thermal insulation increasing the thermal decoupling of the internal cavity of first enclosure and the internal volume of the second enclosure from the respective surrounding environment.

17. A leak detection device comprising:
   a first enclosure defining an internal cavity configured to receive an element to be tested, the element to be tested defining an internal volume;
   a second enclosure defining an internal volume, wherein the internal cavity of the first enclosure and the internal volume of the second enclosure are selectively sealed from an environment surrounding the respective first enclosure and the second enclosure;
   a housing positioned in outer surrounding relation to the second enclosure, the housing further comprising a first wall and a second wall spaced from the first wall and defining a volume between the first wall and the second wall;
   a vacuum pump in communication with the volume between the first wall and the second wall;
   a measuring module positioned in the internal volume of the second enclosure, the measuring module operable to measure a physical quantity of a liquid leak level;
   at least one aeraulic connection connecting to said measuring module and in pressure communication with the internal cavity of the first enclosure or the internal volume of the element to be tested;
   at least one of the first enclosure or the second enclosure including thermal insulation operable to thermally insulate the respective internal cavity of the first enclosure or the internal volume of the second enclosure from the environment surrounding the respective first enclosure or the second enclosure increasing thermal decoupling of the respective internal cavity of the first enclosure or the internal volume of the second enclosure and the respective surrounding environment, the thermal insulation having a thermal conductivity less than 0.05 $W \cdot m^{-1} \cdot K^{-1}$ at 20° C.; and
   a further thermal insulation comprising a depressurized volume in the volume between the first wall and the second wall by the vacuum pump.

* * * * *